(12) United States Patent
Herbert et al.

(10) Patent No.: US 7,254,707 B2
(45) Date of Patent: *Aug. 7, 2007

(54) PLATFORM AND METHOD FOR REMOTE ATTESTATION OF A PLATFORM

(75) Inventors: Howard C. Herbert, Phoenix, AZ (US); David W. Grawrock, Aloha, OR (US); Carl M. Ellison, Portland, OR (US); Roger A. Golliver, Beaverton, OR (US); Derrick C. Lin, Foster City, CA (US); Francis X. McKeen, Portland, OR (US); Gilbert Neiger, Portland, OR (US); Ken Reneris, Wilbraham, MA (US); James A. Sutton, Portland, OR (US); Shreekant S. Thakkar, Portland, OR (US); Millind Mittal, Palo Alto, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/203,538

(22) Filed: Aug. 12, 2005

(65) Prior Publication Data
US 2006/0015719 A1    Jan. 19, 2006

Related U.S. Application Data

(63) Continuation of application No. 09/541,108, filed on Mar. 31, 2000, now Pat. No. 6,990,579.

(51) Int. Cl.
*H04L 9/00* (2006.01)

(52) U.S. Cl. .............. 713/164; 713/165; 713/193; 711/152; 711/153; 711/170; 711/173

(58) Field of Classification Search ........ 713/164–173, 713/193; 711/152, 153, 173, 170, 163
See application file for complete search history.

(56) References Cited

U.S. PATENT DOCUMENTS

| | | | | | |
|---|---|---|---|---|---|
| 4,787,031 | A | * | 11/1988 | Karger et al. | 718/100 |
| 4,858,117 | A | * | 8/1989 | DiChiara et al. | 711/208 |
| 5,758,124 | A | * | 5/1998 | Ogata et al. | 703/27 |
| 5,919,257 | A | * | 7/1999 | Trostle | 726/22 |
| 5,935,242 | A | * | 8/1999 | Madany et al. | 713/1 |
| 6,357,004 | B1 | * | 3/2002 | Davis | 713/100 |
| 6,515,988 | B1 | * | 2/2003 | Eldridge et al. | 370/389 |
| 6,611,913 | B1 | * | 8/2003 | Carroll et al. | 713/171 |

(Continued)

OTHER PUBLICATIONS

Ellison et al. U.S. Appl. 11/386,269 filed Mar. 21, 2006—Protecting Software Environment in Isolated Execution.

*Primary Examiner*—Kambiz Zand
*Assistant Examiner*—Tongoc Tran
(74) *Attorney, Agent, or Firm*—Michael R. Barre

(57) ABSTRACT

In one embodiment, a method of attestation involves a special mode of operation. The method comprises storing an audit log within protected memory of a platform. The audit log is a listing of data representing one or more software modules loaded into the platform. The audit log is retrieved from the protected memory in response to receiving an attestation request. Then, the retrieved audit log is digitally signed to produce a digital signature in response to the attestation request.

16 Claims, 8 Drawing Sheets

U.S. PATENT DOCUMENTS 6,684,326 B1 * 1/2004 Cromer et al. .................. 713/2
6,990,579 B1 * 1/2006 Herbert et al. .............. 713/164
2003/0196085 A1 * 10/2003 Lampson et al. ........... 713/156
2005/0188198 A1 8/2005 Ellison et al.

* cited by examiner

PLATFORM AND METHOD FOR REMOTE ATTESTATION OF A PLATFORM

CROSS-REFERENCE TO RELATED APPLICATIONS

This application is a Continuation of U.S. patent application Ser. No. 09/541,108 filed Mar. 31, 2000 now U.S. Pat. No. 6,990,579.

BACKGROUND

1. Field

This invention relates to the field of platform security.

2. Background

Advances in microprocessor and communication technologies with a platform have opened up many opportunities for applications that go beyond the traditional ways of doing business. Electronic commerce (e-commerce) and business-to-business (B2B) transactions are now becoming popular, reaching the global markets at a fast rate. Unfortunately, while modern microprocessor technology provides users with convenient and efficient methods of doing business, communicating and transacting, this technology fails to support remote attestation. Remote attestation is a technique for ascertaining the operating state of a remotely located platform in a generally secure manner. By ascertaining the operating state of the platform prior to conducting e-commerce or B2B transactions with that platform, the user is imparted with greater confidence in the security of the transaction.

BRIEF DESCRIPTION OF THE DRAWINGS

The features and advantages of the present invention will become apparent from the following detailed description of the present invention in which.

DESCRIPTION

Figure 1A:
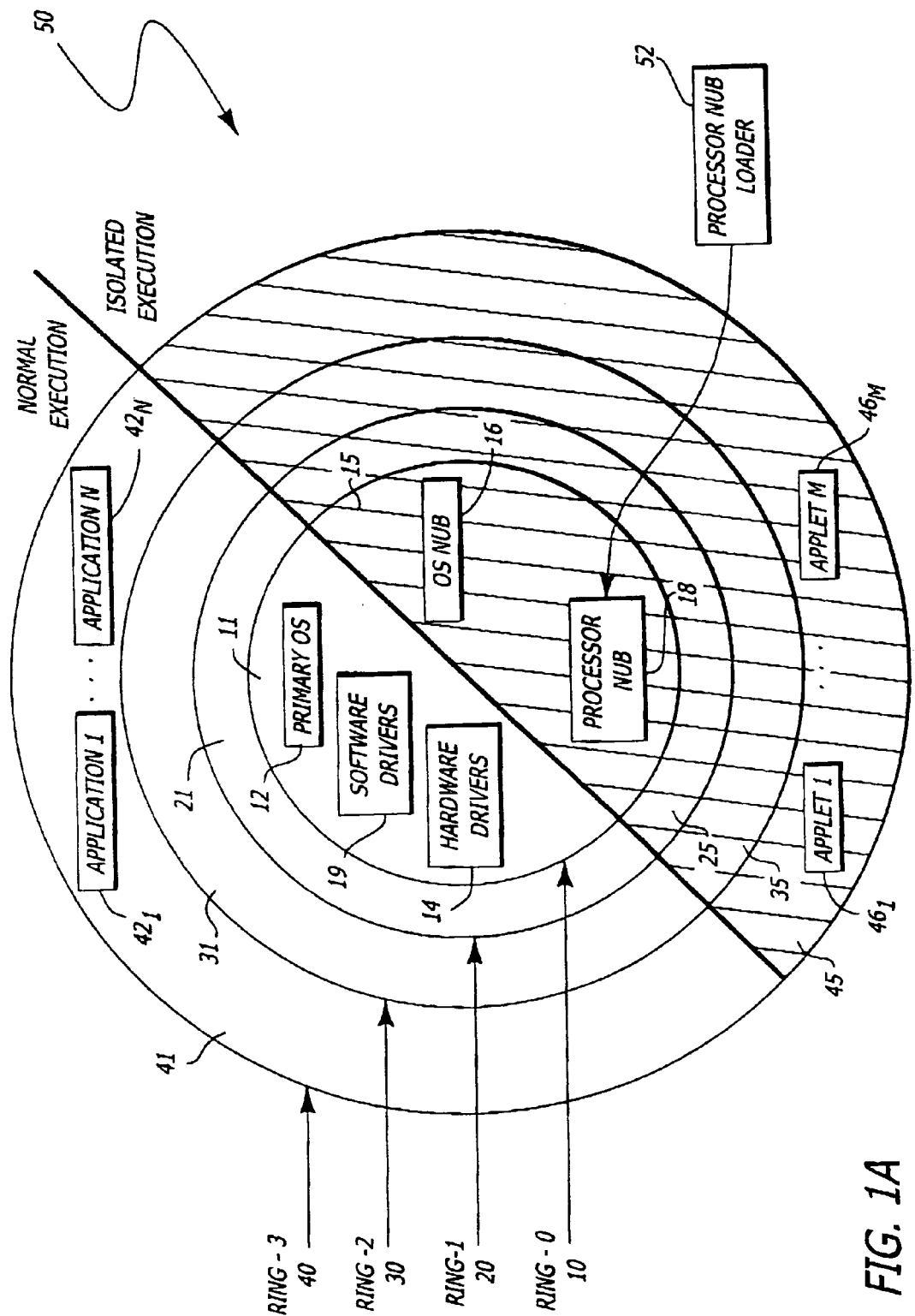
FIG. 1A is a diagram illustrating an embodiment of the logical operating architecture for the IsoX™ architecture of the platform.

The present invention relates to a platform and method for remote attestation of a platform. Remote attestation may be conducted when the platform is operating in a special mode of operation. An example of this special mode includes a processor isolated execution "IsoX" mode as described below. More specifically, a processor executing in IsoX mode utilizes hardware-protected keying material that is cryptographically unique to produce a digital signature that includes information concerning the operating environment of the platform. The hardware that provides protection of the keying material, referred to herein as a "remote attestation unit" (RAU), may be integrated in a core logic device (e.g., a processor or a chipset component) or a non-core logic device (e.g., token).

In the following description, certain terminology is used to discuss features of the present invention. For example, a "platform" includes components that perform different functions on stored information. Examples of a platform include, but are not limited or restricted to a computer (e.g., desktop, a laptop, a hand-held, a server, a workstation, etc.), desktop office equipment (e.g., printer, scanner, a facsimile machine, etc.), a wireless telephone handset, a television set-top box, and the like. Examples of a "component" include hardware (e.g., an integrated circuit, etc.) and/or one or more software modules. A "software module" is code that, when executed, performs a certain function. This code may include an operating system, an application, an applet or even a nub being a series of code instructions, possibly a subset of code from an applet. A "link" is broadly defined as one or more information-carrying mediums (e.g., electrical wire, optical fiber, cable, bus, or air in combination with wireless signaling technology) to establish a communication pathway. This pathway is deemed "protected" when it is virtually impossible to modify information routed over the pathway without detection.

In addition, the term "information" is defined as one or more bits of data, address, and/or control and a "segment" is one or more bytes of information. A "message" is a grouping of information, possibly packetized information. "Keying material" includes any information needed for a specific cryptographic algorithm such as a Digital Signature Algorithm. A "one-way function" is a function, mathematical or otherwise, that converts information from a variable-length to a fixed-length (referred to as a "hash value" or "digest"). The term "one-way" indicates that there does not readily exist an inverse function to recover any discernible portion of the original information from the fixed-length hash value. Examples of a hash function include MD5 provided by RSA Data Security of Redwood City, Calif., or Secure Hash Algorithm (SHA-1) as specified in a 1995 publication Secure Hash Standard FIPS 180-1 entitled "Federal Information Processing Standards Publication" (Apr. 17, 1995).

I. Architecture Overview

In one embodiment, a platform utilizing the present invention may be configured with an isolated execution (IsoX™) architecture. The IsoX™ architecture includes logical and physical definitions of hardware and software components that interact directly or indirectly with an operating system of the platform. Herein, the operating system and a processor of the platform may have several levels of hierarchy, referred to as rings, which correspond to various operational modes. A "ring" is a logical division of hardware and software components that are designed to perform dedicated tasks within the platform. The division is typically based on the degree or level of privilege, namely the ability to make changes to the platform. For example, a ring-0 is the innermost ring, being at the highest level of the hierarchy. Ring-0 encompasses the most critical, privileged components. Ring-3 is the outermost ring, being at the lowest level of the hierarchy. Ring-3 typically encompasses user level applications, which are normally given the lowest level of privilege. Ring-1 and ring-2 represent the intermediate rings with decreasing levels of privilege.

FIG. 1A is a diagram illustrating an embodiment of a logical operating architecture 50 of the IsoX™ architecture. The logical operating architecture 50 is an abstraction of the components of the operating system and processor. The logical operating architecture 50 includes ring-0 10, ring-1 20, ring-2 30, ring-3 40, and a processor nub loader 52. Each ring in the logical operating architecture 50 can operate in either (i) a normal execution mode or (ii) an IsoX mode. The processor nub loader 52 is an instance of a processor executive (PE) handler.

Ring-0 10 includes two portions: a normal execution Ring-0 11 and an isolated execution Ring-0 15. The normal execution Ring-0 11 includes software modules that are critical for the operating system, usually referred to as the "kernel". These software modules include a primary operating system 12 (e.g., kernel), software drivers 13, and hardware drivers 14. The isolated execution Ring-0 15 includes an operating system (OS) nub 16 and a processor nub 18 as described below. The OS nub 16 and the processor nub 18 are instances of an OS executive (OSE) and processor executive (PE), respectively. The OSE and the PE are part of executive entities that operate in a protected environment associated with the isolated area 70 and the IsoX mode. The processor nub loader 52 is a bootstrap loader code that is responsible for loading the processor nub 18 from the processor or chipset into an isolated area as will be explained later.

Similarly, ring-1 20, ring-2 30, and ring-3 40 include normal execution ring-1 21, ring-2 31, ring-3 41, and isolated execution ring-1 25, ring-2 35, and ring-3 45, respectively. In particular, normal execution ring-3 includes N applications $42_1$-$42_N$ and isolated execution ring-3 includes M applets $46_1$-$46_M$ (where 'N' and "M" are positive whole numbers).

One concept of the IsoX™ architecture is the creation of an isolated region in the system memory, which is protected by components of the platform (e.g., the processor and chipset). This isolated region, referred to herein as an "isolated area," may also be in cache memory that is protected by a translation look aside (TLB) access check. Access to this isolated area is permitted only from a front side bus (FSB) of the processor, using special bus cycles (referred to as "isolated read and write cycles") issued by the processor executing in IsoX mode.

It is contemplated that links dedicated to solely support special cycles during remote attestation (referred to as "attestation cycles") may be employed within the platform. These attestation cycles may be based on the isolated read and write cycles or may be independent from the isolated read and write cycles. In lieu of dedicated links, shared links may be employed within the platform to support remote attestation. Examples of these shared links include a Peripheral Component Interconnect (PCI) bus, an accelerated graphics port (AGP) bus, an Industry Standard Architecture (ISA) bus, a Universal Serial Bus (USB) bus and the like. The attestation cycles are issued to prove locality, namely that a device with the keying material and a signing engine is accessing information (e.g., an audit log) stored in protected memory within the platform. This mitigates the threat of software simulating the retrieval of the audit log for example.

The IsoX mode is initialized using a privileged instruction in the processor, combined with the processor nub loader 52. The processor nub loader 52 verifies and loads a ring-0 nub software module (e.g., processor nub 18) into the isolated area. For security purposes, the processor nub loader 52 is non-modifiable, tamper-resistant and non-substitutable. In one embodiment, the processor nub loader 52 is implemented in read only memory (ROM).

One task of the processor nub 18 is to verify and load the ring-00S nub 16 into the isolated area. The OS nub 16 provides links to services in the primary operating system 12 (e.g., the unprotected segments of the operating system), provides page management within the isolated area, and has the responsibility for loading ring-3 application modules 45, including applets $46_1$ to $46_M$, into protected pages allocated in the isolated area. The OS nub 16 may also support paging of data between the isolated area and ordinary (e.g., non-isolated) memory. If so, then the OS nub 16 is also responsible for the integrity and confidentiality of the isolated area pages before evicting the page to the ordinary memory, and for checking the page contents upon restoration of the page.

Figure 1B:
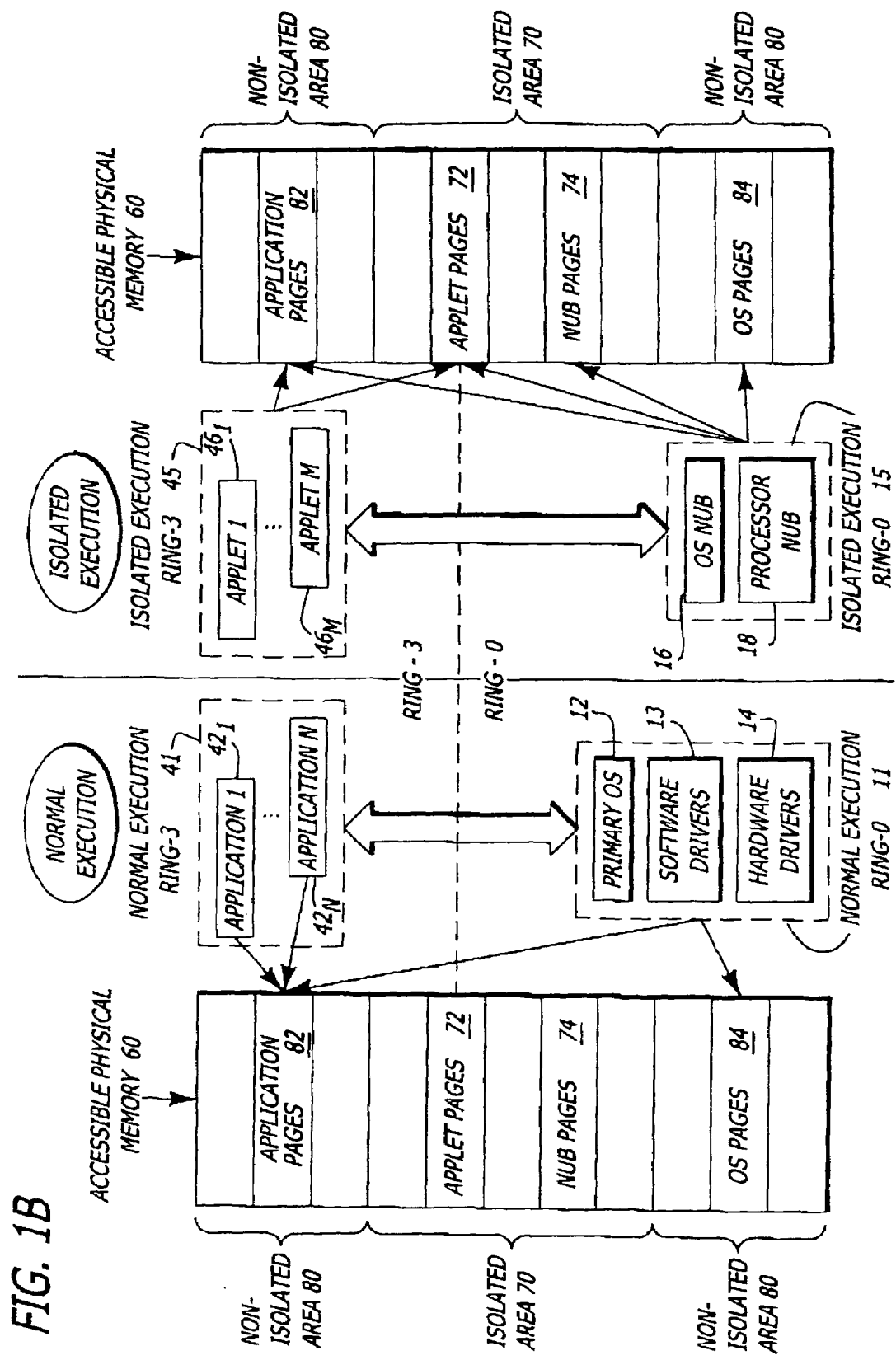
FIG. 1B is an illustrative diagram showing the accessibility of various elements in the operating system and the processor according to one embodiment of the invention.

Referring now to FIG. 1B, a diagram of the illustrative elements associated with the operating system 10 and the processor for one embodiment of the invention is shown. For illustration purposes, only elements of ring-0 10 and ring-3 40 are shown. The various elements in the logical operating architecture 50 access an accessible physical memory 60 according to their ring hierarchy and the execution mode.

The accessible physical memory 60 includes an isolated area 70 and a non-isolated area 80. The isolated area 70 includes applet pages 72 and nub pages 74. The non-isolated area 80 includes application pages 82 and operating system pages 84. The isolated area 70 is accessible only to components of the operating system and processor operating in the IsoX mode. The non-isolated area 80 is accessible to all elements of the ring-0 operating system and processor.

The normal execution ring-0 11 including the primary OS 12, the software drivers 13, and the hardware drivers 14, can access both the OS pages 84 and the application pages 82. The normal execution ring-3, including applications $42_1$ to $42_N$, can access only to the application pages 82. Both the normal execution ring-0 11 and ring-3 41, however, cannot access the isolated area 70.

The isolated execution ring-0 15, including the OS nub 16 and the processor nub 18, can access to both of the isolated area 70, including the applet pages 72 and the nub pages 74, and the non-isolated area 80, including the application pages 82 and the OS pages 84. The isolated execution ring-3 45, including applets $46_1$ to $46_M$, can access only to the application pages 82 and the applet pages 72. The applets $46_1$ to $46_M$ reside in the isolated area 70.

Figure 1C:
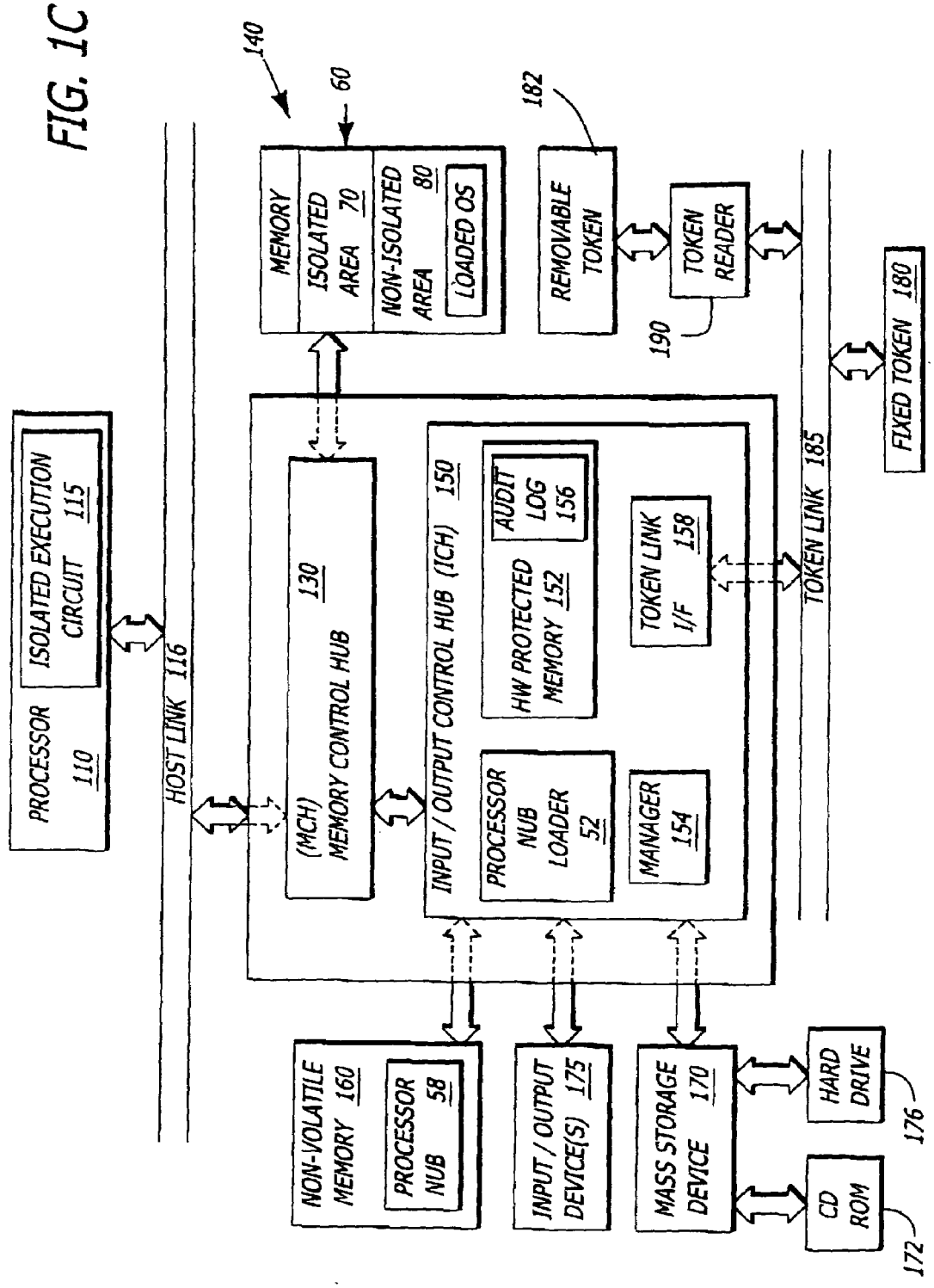
FIG. 1C is a first block diagram of an illustrative embodiment of a platform utilizing the present invention.

Referring to FIG. 1C, a block diagram of an illustrative embodiment of a platform utilizing the present invention is shown. In this embodiment, platform 100 comprises a processor 110, a chipset 120, a system memory 140 and peripheral components (e.g., tokens 180/182 coupled to a token link 185 and/or a token reader 190) in communication with each other. It is further contemplated that the platform 100 may contain optional components such as a non-volatile memory (e.g., flash) 160 and additional peripheral components. Examples of these additional peripheral components include, but are not limited or restricted to a mass storage device 170 and one or more input/output (I/O) devices 175. For clarity, the specific links for these peripheral components (e.g., PCI bus, AGP bus, ISA bus, USB bus, wireless transmitter/receiver combinations, etc.) are not shown.

In general, the processor 110 represents a central processing unit of any type of architecture, such as complex instruction set computers (CISC), reduced instruction set computers (RISC), very long instruction word (VLIW), or hybrid architecture. In one embodiment, the processor 110 includes multiple logical processors. A "logical processor," sometimes referred to as a thread, is a functional unit within a physical processor having an architectural state and physical resources allocated according to a specific partitioning functionality. Thus, a multi-threaded processor includes multiple logical processors. The processor 110 is compatible with the Intel Architecture (IA) processor, such as a PENTIUM® series, the IA-32™ and IA-64™. It will be appreciated by those skilled in the art that the basic description and operation of the processor 110 applies to either a single processor platform or a multi-processor platform.

Figure 3:
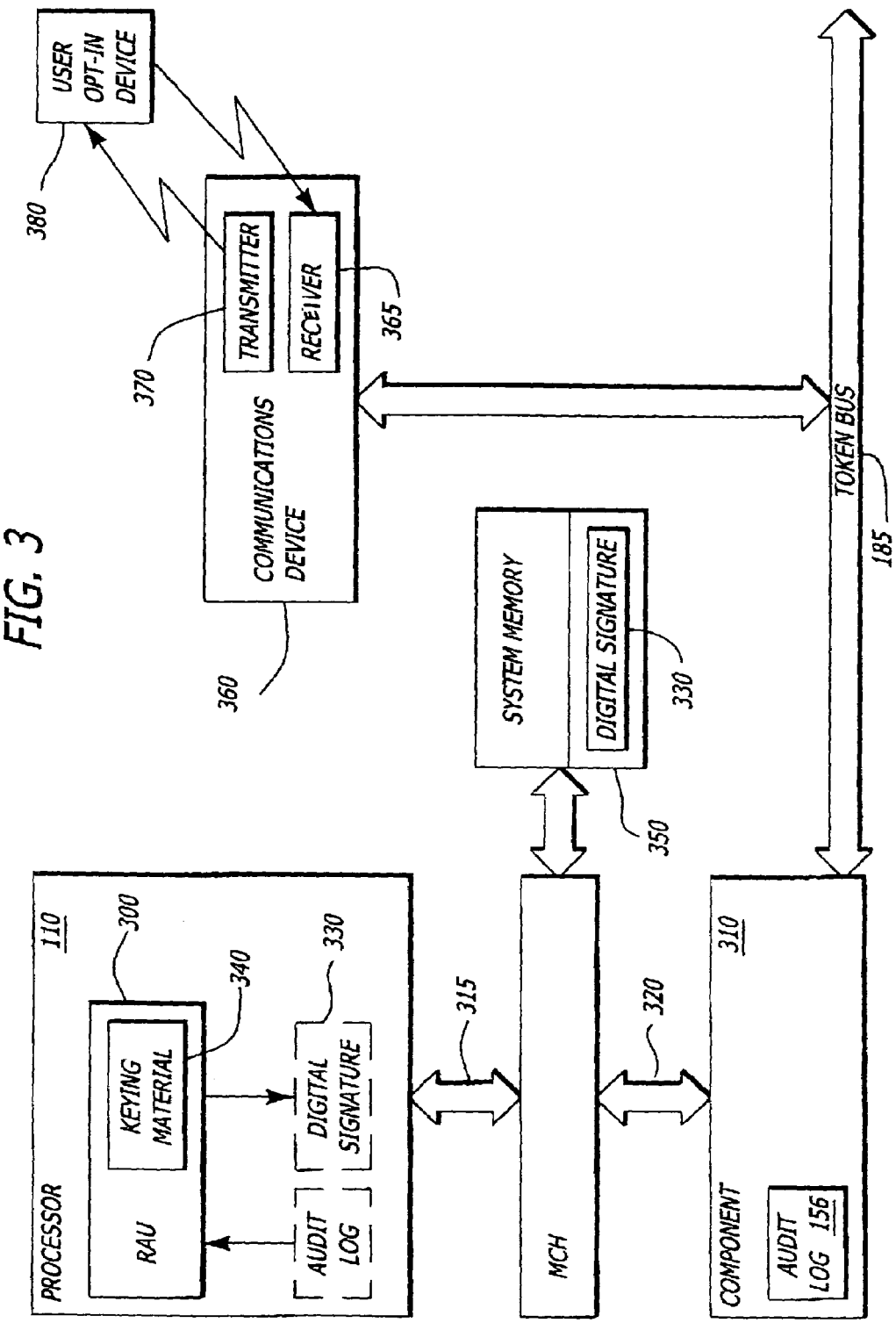
FIG. 3 is a block diagram of an illustrative embodiment of a remote attestation unit employed in the processor of FIG. 1C to obtain a protected copy of the audit log.

The processor 110 may operate in a normal execution mode or an IsoX mode. In particular, an isolated execution circuit 115 provides a mechanism to allow the processor 110 to operate in an IsoX mode. The isolated execution circuit 115 provides hardware and software support for the IsoX mode. This support includes configuration for isolated execution, definition of the isolated area, definition (e.g., decoding and execution) of isolated instructions, generation of isolated access bus cycles, and generation of isolated mode interrupts. In one embodiment, as shown in FIG. 3, the RAU may be implemented as part of the processor 110.

As shown in FIG. 1C, a host link 116 is a front side bus that provides interface signals to allow the processor 110 to communicate with other processors or the chipset 120. In addition to normal mode, the host link 116 supports an isolated access link mode with corresponding interface signals for isolated read and write cycles when the processor 110 is configured in the IsoX mode. The isolated access link mode is asserted on memory accesses initiated while the processor 110 is in the IsoX mode if the physical address falls within the isolated area address range. The isolated access link mode is also asserted on instruction pre-fetch and cache write-back cycles if the address is within the isolated area address range. The processor 110 responds to snoop cycles to a cached address within the isolated area address range if the isolated access bus cycle is asserted.

Figure 4:
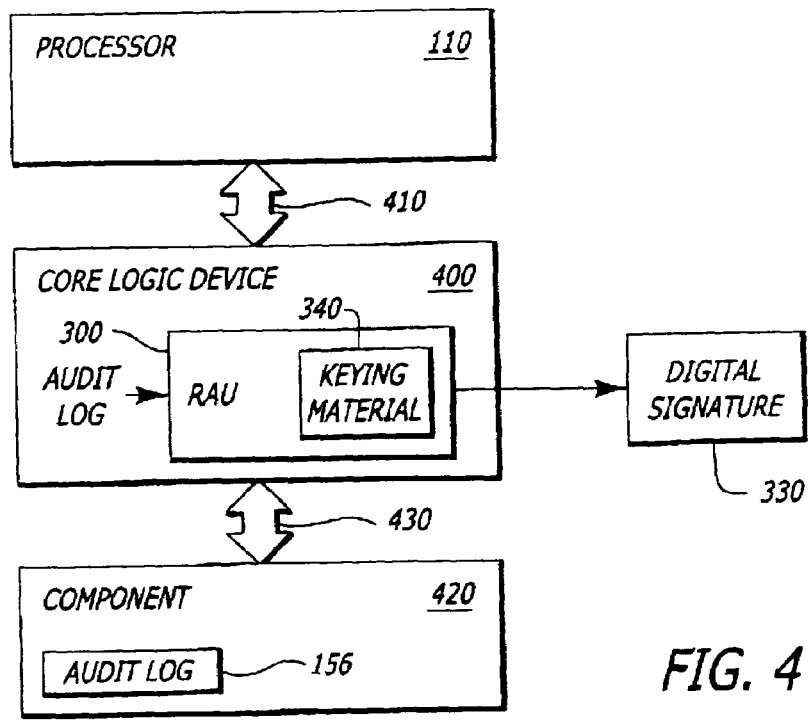
FIG. 4 is a block diagram of an illustrative embodiment of a remote attestation unit employed in the chipset of FIG. 1C to obtain a protected copy of the audit log external to the chipset.

Herein, the chipset 120 includes a memory control hub (MCH) 130 and an input/output control hub (ICH) 150 described below. The MCH 130 and the ICH 150 may be integrated into the same chip or placed in separate chips operating together. In another embodiment, as shown in FIG. 4, the RAU may be implemented as part of the chipset 120.

With respect to the chipset 120, a MCH 130 provides control and configuration of memory and input/output devices such as the system memory 140 and the ICH 150. The MCH 130 provides interface circuits to recognize and service attestation cycles and/or isolated memory read and write cycles. In addition, the MCH 130 has memory range registers (e.g., base and length registers) to represent the isolated area in the system memory 140. Once configured, the MCH 130 aborts any access to the isolated area when the isolated access link mode is not asserted.

The system memory 140 stores code and data. The system memory 140 is typically implemented with dynamic random access memory (DRAM) or static random access memory (SRAM). The system memory 140 includes the accessible physical memory 60 (shown in FIG. 1B). The accessible physical memory 60 includes the isolated area 70 and the non-isolated area 80 as shown in FIG. 1B. The isolated area 70 is the memory area that is defined by the processor 110 when operating in the IsoX mode. Access to the isolated area 70 is restricted and is enforced by the processor 110 and/or the chipset 120 that integrates the isolated area functionality. The non-isolated area 80 includes a loaded operating system (OS). The loaded OS 142 is the portion of the operating system that is typically loaded from the mass storage device 170 via some boot code in a boot storage such as a boot read only memory (ROM). Of course, the system memory 140 may also include other programs or data which are not shown.

As shown in FIG. 1C, the ICH 150 supports isolated execution in addition to traditional I/O functions. In this embodiment, the ICH 150 comprises at least the processor nub loader 52 (shown in FIG. 1A), a hardware-protected memory 152, an isolated execution logical processing manager 154, and a token link interface 158. For clarity, only one ICH 150 is shown although platform 100 may be implemented with multiple ICHs. When there are multiple ICHs, a designated ICH is selected to control the isolated area configuration and status. This selection may be performed by an external strapping pin. As is known by one skilled in the art, other methods of selecting can be used.

The processor nub loader 52, as shown in FIGS. 1A and 1C, includes a processor nub loader code and its hash value (or digest). After being invoked by execution of an appropriated isolated instruction (e.g., ISO_INIT) by the processor 110, the processor nub loader 52 is transferred to the isolated area 70. Thereafter, the processor nub loader 52 copies the processor nub 18 from the non-volatile memory 160 into the isolated area 70, verifies and places a representation of the processor nub 18 (e.g., a hash value) into the protected memory 152. Herein, the protected memory 152 is implemented as a memory array with single write, multiple read capability. This non-modifiable capability is controlled by logic or is part of the inherent nature of the memory itself. For example, as shown, the protected memory 152 may include a plurality of single write, multiple read registers.

Figure 2:
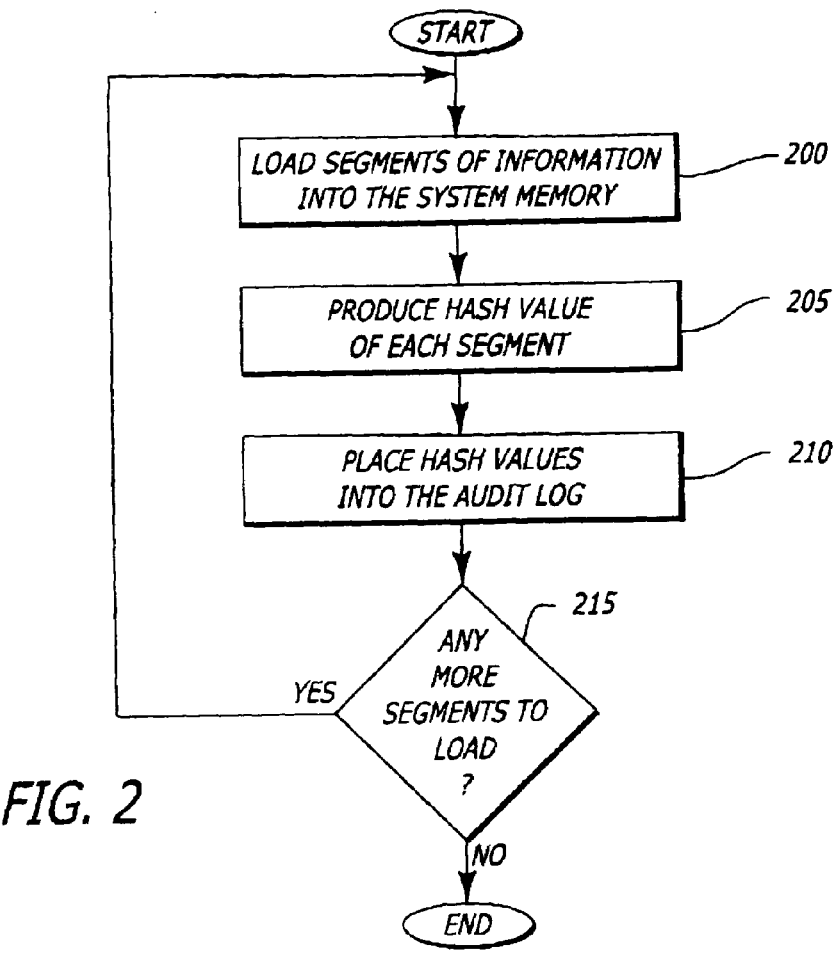
FIG. 2 is a flowchart of the illustrative operations of the platform to generate an embodiment of the protected audit log.

As shown in FIGS. 1C and 2, the protected memory 152 is configured to support an audit log 156. An "audit log" 156 is information concerning the operating environment of the platform 100; namely, a listing of data that represents what information has been successfully loaded into the system memory 140 after power-on of the platform 100. For example, the representative data may be hash values of each software module loaded into the system memory 140. These software modules may include the processor nub 18, the OS nub 16, and/or any other critical software modules (e.g., ring-0 modules) loaded into the isolated area 70. Thus, the audit log 156 can act as a fingerprint that identifies information loaded into the platform (e.g., the ring-0 code controlling the isolated execution configuration and operation), and is used to attest or prove the state of the current isolated execution.

In another embodiment, both the protected memory 152 and unprotected memory (e.g., a memory array in the non-isolated area 80 of the system memory 140 of FIG. 1C) may collectively provide a protected audit log 156. The audit log 156 is stored in the memory array while information concerning the state of the audit log 156 (e.g., a total hash value for the representative data within the audit log 156) is stored in the protected memory 152.

Referring still to FIG. 1C, the non-volatile memory 160 stores non-volatile information. Typically, the non-volatile memory 160 is implemented in flash memory. The non-volatile memory 160 includes the processor nub 18 as described above. Additionally, the processor nub 18 may also provide application programming interface (API) abstractions to low-level security services provided by other hardware and may be distributed by the original equipment manufacturer (OEM) or operating system vendor (OSV) via a boot disk.

The mass storage device 170 stores archive information such as code (e.g., processor nub 18), programs, files, data, applications (e.g., applications $42_1$-$42_N$), applets (e.g., applets $46_1$ to $46_M$) and operating systems. The mass storage device 170 may include a compact disk (CD) ROM 172, a hard drive 176, or any other magnetic or optic storage devices. The mass storage device 170 also provides a mechanism to read platform-readable media. When implemented in software, the elements of the present invention are stored in a processor readable medium. The "processor readable medium" may include any medium that can store or transfer information. Examples of the processor readable medium include an electronic circuit, a semiconductor memory device, a read only memory (ROM), a flash memory, an erasable programmable ROM (EPROM), a fiber optic medium, a radio frequency (RF) link, and any platform readable media such as a floppy diskette, a CD-ROM, an optical disk, a hard disk, etc.

In communication with the platform 100, I/O devices 175 include stationary or portable user input devices, each of which performs one or more I/O functions. Examples of a stationary user input device include a keyboard, a keypad, a mouse, a trackball, a touch pad, and a stylus. Examples of a portable user input device include a handset, beeper, hand-held (e.g., personal digital assistant) or any wireless device. The I/O devices 175 enable remote attestation of the platform 100 as described below.

The token link 185 provides an interface between the ICH 150 and a fixed token 180 (e.g., a motherboard token) and/or a token reader 190 in communication with a removable token 182 having characteristics similar to a smart card. In general, both types of tokens are devices that perform dedicated I/O functions. For embodiments shown in FIGS. 6 and 7, tokens 180 and/or 182 include keying material (e.g., unique cryptographic identifier such as a public/private key pair) and functionality to digitally sign the audit log (or a representation thereof) with the private key of the key pair. The token link interface 158 in the ICH 150 provides a logical coupling between the token link 185 and the ICH 150 and supports remote attestation for recovery of the contents of the audit log 156.

II. Generating and Utilizing a Protected Audit Log

Referring now to FIG. 2, a flowchart of the illustrative operations of the platform to generate an embodiment of the protected audit log is shown. After power-on of the platform, segments of information are loaded into the system memory for processing by a processor (block 200). Examples of these segments of information include the processor nub and the OS nub. Concurrent with the loading of the segments of information into the system memory, copies of each segment of the information undergo a cryptographic hash operation to produce a hash value of the segments. These hash values form an audit log stored in protected memory (blocks 205 and 210). In one embodiment, as shown in FIG. 1C, the protected memory is implemented within the ICH. The memory is deemed "protected" when the contents of the memory are readable and non-modifiable as described above. As subsequent segments of information are selected for storage into the audit log, their hash values are appended to the audit log behind the previously computed hash values (block 215). It is contemplated that only hash values of selected nubs may be stored in the audit log.

III. Remote Attestation

A. Commencement of Remote Attestation

In one embodiment, remote attestation is initiated by issuing an attestation request. The attestation request can originate from a remote source or from an agent, local to the platform, which may or may not be acting as a proxy for the remote source. Normally, the attestation request comprises a primary query and/or one or more optional secondary queries. Each query causes the issuance of the attestation cycles, which are designed to retrieve contents of the audit log. At a minimum, the contents of the audit log may be used to verify the integrity of IsoX™ processor and the OS nub of the platform. The secondary query retrieves, in addition to the audit log, a hash value of a selected IsoX applet loaded by the platform in order to verify the integrity of the applet. The hash value of the applet is generated on the fly by the OS nub. This avoids the need to store each and every loaded applet in the audit log. For primary queries, the RAU creates a message that may include the audit log, a digital signature covering the audit log, and one or more digital certificates for the RAU keying material and returns the message to the requestor. For secondary queries, the RAU creates a message that may include the applet hash, the audit log, a digital signature covering the applet hash and audit log, and one or more digital certificates for the RAU keying material and returns the message to the requestor to retrieve different information cited above.

B. Processor Integrated RAU

Referring now to FIG. 3, the RAU 300 is integrated into the processor 110. The processor 110 is executing local code. Upon detection of an attestation request, the processor 110 establishes a communication pathway with a component 310 responsible for storing the audit log 156. More specifically, in one embodiment, the local code executes a physical instruction in response to an attestation request. The physical instruction, when executed by the processor 110, causes the issuance of attestation cycles by the processor 110 for reading contents of the audit log 156.

For illustrative sake, the component 310 may be the ICH 150 of FIG. 1C, although other components within the platform 100 may be used. The communications between the processor 110 and component 310 are through one or more links such as a first link 310 and a second link 320. These links 310 and 320 may be configured as dedicated links for handling attestation cycles or shared links (e.g., host link, PCI bus, etc.) enhanced to handle the attestation cycles. These attestation cycles signal the component 310 to accept reads of the audit log 156.

Upon receiving the audit log 156, the RAU 300 in the processor 110 produces a digital signature 330 by digitally signing the audit log 156 with the keying material 340 (e.g., a pre-stored private key). The audit log 156, digital signature 330, and possibly digital certificates from the RAU keying material and packetized and sent as a message by the RAU 300 to the requestor or to an area 350 accessible to the local code.

Of course, it is contemplated that if the audit log 156 is stored in unprotected memory, the ICH 150 may include a component (not shown) to verify that the contents of the audit log 156 have not been modified before releasing the audit log 156 to the processor 110. This may be accomplished by the component 310 generating a hash value of the audit log 156 recovered from unprotected memory and comparing the hash value to the total hash value stored in protected memory.

As an optional embodiment, the user may want to control when the keying material 340 is used. For example, the platform may issue a request message via a communications device 360 to a user opt-in device 380 over a protected communication path. In one embodiment, the communications device 360 is coupled to the token bus 185 and is employed with a wireless receiver 365 and a wireless transmitter 370 (collectively referred to herein as a "wireless transceiver"). The wireless receiver and transmitter 365 and 370 are used to establish and maintain direct communications with the user opt-in device 380. Of course, the user opt-in device 380 may be coupled to communications device 360 via any link type.

Upon receipt of the request message, the communications device 360 issues a message to the user opt-in device 380 which enables the user to affirm his or her desire to release the keying material 340 for generation of the digital signature 330. Based on an input by the user or lack thereof (e.g., depression of a key associated with user opt-in device 380, inaction by the user, etc.), a response message is returned to the communications device 360, which routes the contents of the response message to the RAU 300 over a protected communication path. Upon receipt of the response message, the RAU 300 proceeds with the generation of the digital signature 330 and/or digital certificates for the RAU keying material and placement in the area 350 accessible to the local code if use of the keying material 340 is authorized by the user.

C. Chipset Integrated RAU

Referring now to FIG. 4, the RAU 300 is integrated into a core logic device 400. As shown, the processor 110 is executing local code. Upon detection of an attestation request, the core logic device 400 establishes a communication pathway with a component 420 responsible for storing the audit log 156. More specifically, in one embodiment, the local code sends a message to core logic device 400 based on an attestation request. The message causes the core logic device 400 to issue attestation cycles for reading contents of the audit log 156.

For example, in response to the attestation request, the core logic device 400 routes the attestation cycles to the component 420 via link 430 to allow contents of the stored audit log 156 to be read. Link 430 may be dedicated to support remote attestation or support multiple functions inclusive of attestation cycles generated by the core logic device 400. Upon receiving the contents of the stored audit log 156, the core logic device 400 that contains the RAU 300 generates a digital signature 330 for the audit log 156 (as described above) and writes the digital signature 330 into an area accessible to the local code.

Figure 5:
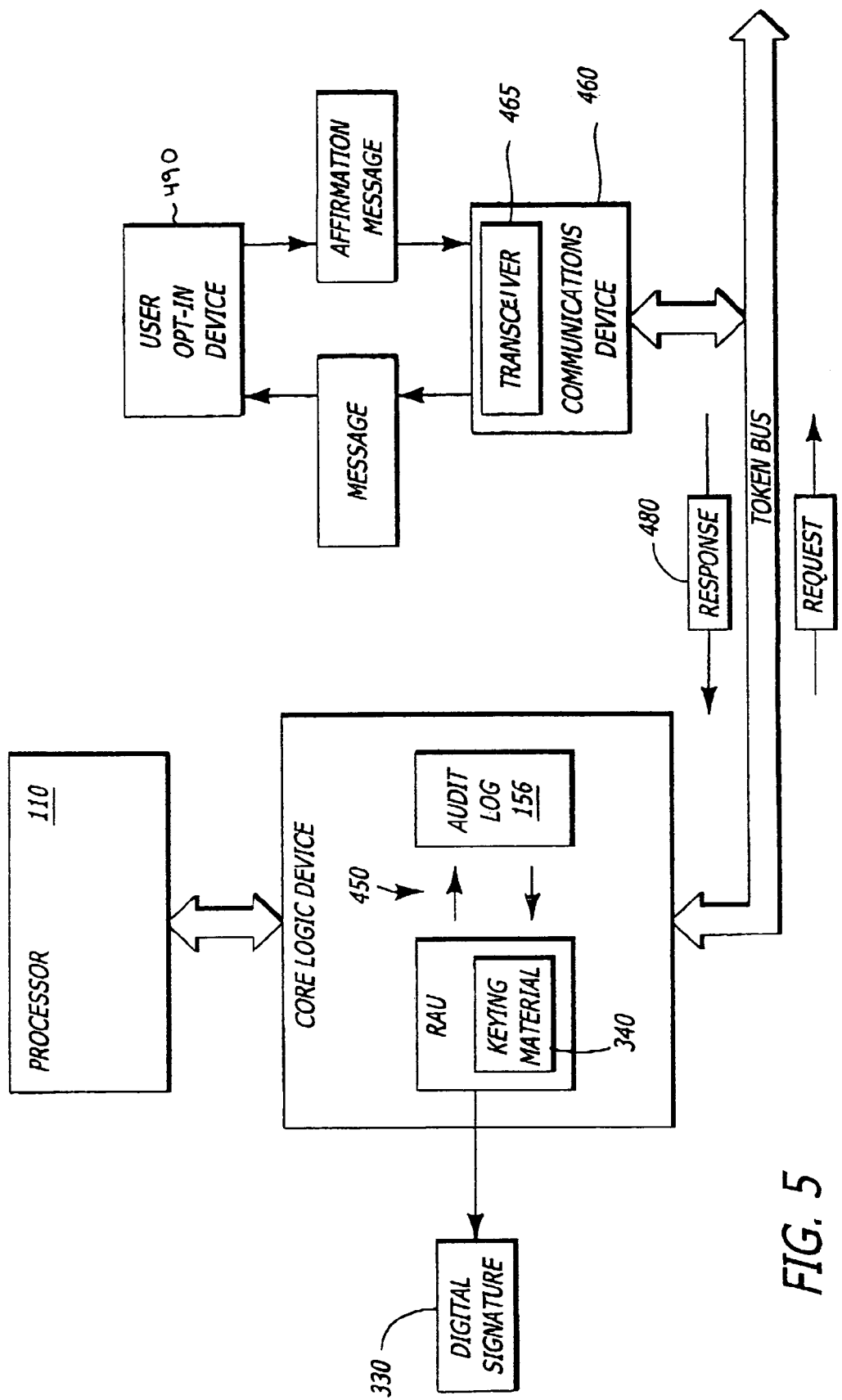
FIG. 5 is a block diagram of an illustrative embodiment of a remote attestation unit employed in the chipset of FIG. 1C to obtain a protected copy of the audit log internal to the chipset.

However, as shown in FIG. 5, if the core logic device 400 also contains the audit log 156, internal signals 450 within the core logic device 400 are used to allow the RAU 300 to access the audit log 156. Again, upon receiving the contents of the audit log 156, the RAU 300 of the core logic device 400 generates the digital signature 330 of the audit log and possibly one or more digital certificates for the RAU keying material (not shown). This information is provided as a message to the requestor or written into the area accessible to the local code.

As an optional embodiment, the user may want to control when the keying material 340 is used. For example, the platform may issue a request message 470 via a communications device 460 to a user opt-in device 490 over a protected communication path. In one embodiment, the communications device 460 is coupled to the token bus 185 and is employed with a wireless transceiver 465 in order to establish and maintain direct communications with the user opt-in device 490.

In response to receiving the request message 470, the communications device 460 issues a message to the user opt-in device 490, which solicits the user to affirm his or her desire to release the keying material 340 for generation of the digital signature 330. Based on an input by the user or lack thereof (e.g., depression of a key associated with the user opt-in device 490, inaction by the user, etc.), a response message 480 is returned to the communications device 460, which routes the contents of the response message 480 to the RAU 300 of the core logic device 400 over a protected communication path. Upon receipt of the response message 480, the RAU 300 proceeds with the generation of the digital signature 330 and possibly digital certificates as described above and placement in the area accessible to the local code if use of the keying material 340 is authorized by the user.

D. Fixed Token Integrated RAU

Figure 6:
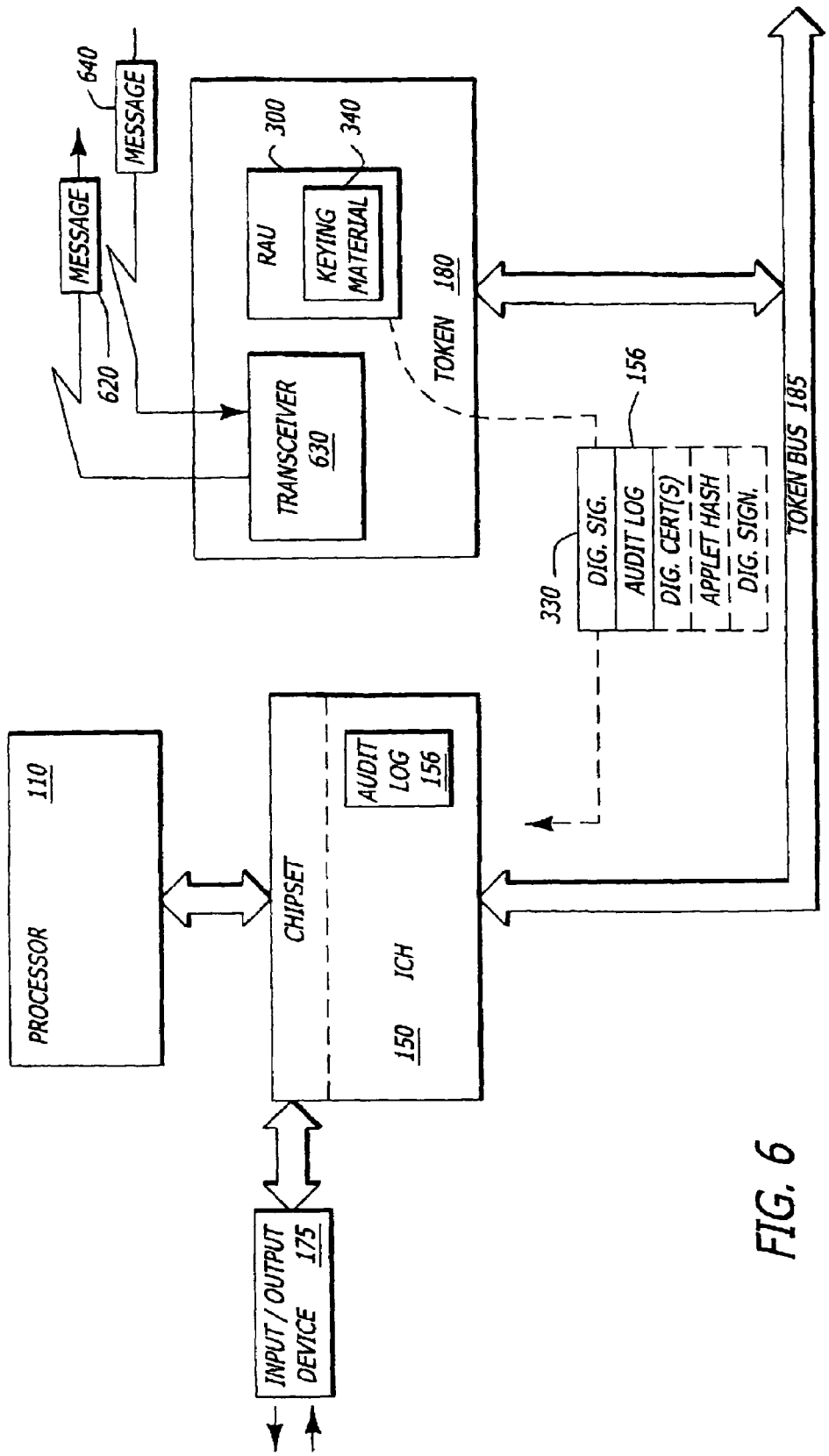
FIG. 6 is a block diagram of an illustrative embodiment of a remote attestation unit employed in the fixed token of FIG. 1C to obtain a protected copy of the audit log.

Referring now to FIG. 6, if the RAU 300 is integrated in the fixed token 180, the fixed token 180 communicates with a component (e.g., ICH 150) holding the audit log 156 over the token link 185. The functionality of token link 185 may be enhanced to support attestation cycles that are only generated by the fixed token 180 when remote attestation is being requested. These attestation cycles are routed to the ICH 150 to request acceptance of reads to the audit log 156. Upon receiving the contents of the audit log 156, the RAU 300 implemented in the fixed token 180 generates a digital signature 330 by digitally signing the audit log 156 with keying material 340 stored in the RAU 300. Thereafter, the RAU 300 writes the digital signature 330 and possibly digital certificates for keying material 340 to the requestor or into an area accessible to the local code.

As an optional embodiment, the user may want to control when the keying material 610 stored in the RAU 300 is used. For example, the user may be prompted to affirm his or her desire to release the keying material 340 for generation of the digital signature 330. The prompt may be accomplished, for example, through transmission of a message 620 via a wireless transceiver 630 situated in the token 180. Affirmation of a desire to release the keying material 340 may be made by either (1) transmitting a return message 640 from a user opt-in device to the token 180 as shown or (2) entering access information via a user opt-in device (not shown) physically connected to the token 180, for example. Thereafter, the RAU 300 proceeds with the generation of the digital signature 330 and/or digital certificate(s) for the keying material 340. Then, this information along with the audit log 156 are sent to the requestor or placed in the area accessible to the local code if use of the keying material 340 has been authorized by the user. Of course, opt-in messages 620 and 640 may be routed through the I/O device 175 provided the messages are protected.

E. Removable Token Integrated RAU

Figure 7:
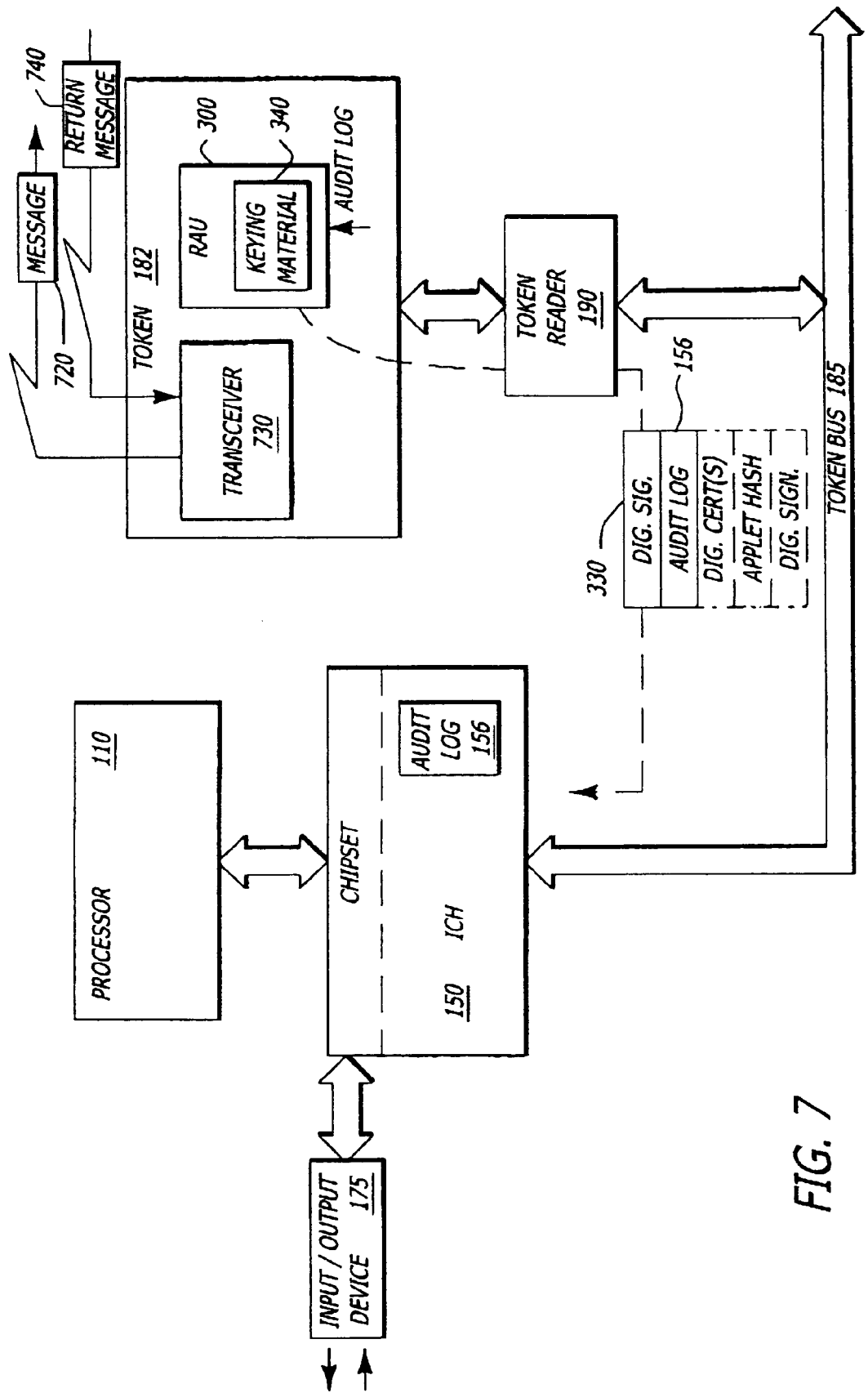
FIG. 7 is a block diagram of an illustrative embodiment of a remote attestation unit employed in the removable token of FIG. 1C to obtain a protected copy of the audit log.

Referring now to FIG. 7, if the RAU 300 is integrated in the removable token 182, the removable token 182 communicates with a component (e.g., ICH 150) holding the audit log 156 over the token link 185. The functionality of token link 185 may be enhanced to support attestation cycles that are only generated by the token reader upon insertion or connection (i.e., wireless token) of removable token 182 when remote attestation is being requested. These attestation cycles are generated by the token reader 190 to the hardware storing the audit log 156 (e.g., ICH 150) to request acceptance of reads to the audit log 156. Upon receiving the contents of the audit log 156, the RAU 300 implemented in the removable token 182 generates the digital signature 330 by digitally signing the audit log 156 with keying material 340 stored in the RAU 300. Thereafter, the RAU 300 writes the digital signature 330 and/or digital certificate(s) for the keying material 340 into an area accessible to the local code.

As an optional embodiment, the user may want to control when the keying material 340 stored in the RAU 300 is used. For example, the user may be prompted to affirm his or her desire to release the keying material 340 for generation of the digital signature 330. The prompt may be accomplished, for example, through transmission of a message 720 via a wireless transceiver 730 situated in the token 182. Affirmation of a desire to release the keying material 340 may be made by either (1) transmitting a return message 740 from a user opt-in device (not shown) to the token 182 as shown or (2) entering access information via a user opt-in device physically connected to the token 182 (not shown) for example. Thereafter, the RAU 300 proceeds with the generation of the digital signature 330 and/or digital certificates for the keying material 340, routing through the token reader 190 and placement in the area accessible to the local code if use of the keying material 340 has been authorized by the user. Of course, opt-in messages 620 and 640 may be routed through the I/O device 175 provided the messages are protected.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. A method comprising:
configuring a processor of a platform to operate in an isolated execution mode in a ring 0 operating mode, wherein the processor also supports one or more higher ring operating modes, as well as a normal execution mode in at least the ring 0 operating mode;
loading at least one software module into a random access memory (RAM) of the platform while the platform is operating in the isolated execution mode;
storing an audit log within protected memory of the platform, the audit log including data representing the software module loaded in the isolated execution mode;
retrieving the audit log from the protected memory in response to receiving an attestation request; and
digitally signing the audit log to produce a digital signature in response to the attestation request.

2. The method of claim 1, wherein the data representing the software module comprises a cryptographic hash value.

3. A method according to claim 1, comprising:
issuing attestation cycles in response to receiving the attestation request; and
utilizing the attestation cycles to retrieve the audit log from the protected memory.

4. A method according to claim 1, wherein the operation of digitally signing the audit log comprises:
utilizing a private key to digitally sign the audit log.

5. A method according to claim 1, wherein:
the operation of loading at least one software module comprises loading, in a high privilege ring of the platform, at least one module selected from the group consisting of a processor nub and an operating system (OS) nub; and
the operation of storing an audit log within protected memory of the platform comprises storing, in the audit log, data that represents at least one loaded module.

6. A method according to claim 1, wherein:
the operation of loading at least one software module comprises loading, in a high privilege ring of the platform, at least one module selected from the group consisting of a processor nub and an operating system (OS) nub; and
the operation of storing an audit log within protected memory of the platform comprises storing, in the audit log, a cryptographic hash value for at least one loaded module.

7. A method according to claim 1, wherein:
the platform comprises a first platform;
the operation of receiving an attestation request comprises receiving the attestation request from a second platform; and
the method further comprises transmitting a response that attests to integrity of the first platform to the second platform.

8. A method according to claim 1, further comprising:
receiving user input; and
determining whether or not to provide remote attestation, based on the user input.

9. A method comprising:
configuring a processor of a processing system to operate in an isolated execution mode in a ring 0 operating mode, wherein the processor also supports one or more higher ring operating modes, as well as a non-isolated execution mode in at least the ring 0 operating mode;
configuring the processing system to establish an isolated memory area in a random access memory (RAM) of the processing system and a non-isolated memory area in the RAM, wherein the processing system does not allow access to the isolated memory area if the processor is not in the isolated execution mode;
loading at least one software module into the isolated memory area of the RAM while the processor is operating in the isolated execution mode;
storing an audit log in the processing system, the audit log including data representing the software module loaded into the isolated memory area;
retrieving the audit log in response to receiving an attestation request; and
digitally signing the audit log to produce a digital signature in response to the attestation request.

10. A method according to claim 9, wherein:
the operation of storing an audit log comprises storing the audit log within protected memory of the processing system.

11. A method according to claim 9, wherein:
the operation of storing an audit log comprises storing the audit log within protected memory of the processing system; and
the operation of retrieving the audit log comprises retrieving the audit log from the protected memory.

12. A method according to claim 9, wherein the operation of storing an audit log comprises storing, in the audit log, data that represents software for booting the processing system.

13. A method according to claim 9, further comprising:
executing a processor nub on the processor in the isolated execution mode;
loading an operating system (OS) nub into the isolated memory area, the OS nub to manage at least a subset of an OS to run on the processing system;

verifying the OS nub, using the processor nub; and
after verifying the OS nub, launching the OS nub.

14. A method according to claim 13, wherein the operation of storing an audit log comprises storing data that represents the processor nub in the audit log.

15. A method according to claim 13, wherein the operation of storing an audit log comprises storing data that represents the OS nub in the audit log.

16. A method according to claim 13, wherein the operation of storing an audit log comprises:

storing data that represents the processor nub in the audit log; and storing data that represents the OS nub in the audit log.

* * * * *